United States Patent [19]
Porter et al.

[11] Patent Number: 6,167,081
[45] Date of Patent: Dec. 26, 2000

[54] DUAL MODE RECEIVER

[76] Inventors: James L. Porter, 8021 NW. 82nd St., Oklahoma City, Okla. 73132; John W. Diehl, 301 N. Clinton Ave., Elmhurst, Ill. 60126; Wayne H. Bradley, 601 Meadowview Dr., West Chicago, Ill. 60185

[21] Appl. No.: 09/389,781

[22] Filed: Sep. 3, 1999

[51] Int. Cl.[7] .............. H03H 7/30; H03H 7/40; H03K 5/159
[52] U.S. Cl. ............ 375/232; 375/328; 375/350; 329/316
[58] Field of Search ............... 375/229, 232, 375/328, 346, 350, 351; 455/226.1, 214, 336, 337, 338, 143; 329/316, 318, 327

[56] References Cited

U.S. PATENT DOCUMENTS

| | | | |
|---|---|---|---|
| 5,159,282 | 10/1992 | Serizawa et al. | 329/316 |
| 5,214,391 | 5/1993 | Serizawa et al. | 326/316 |
| 5,283,531 | 2/1994 | Serizawa et al. | 329/316 |
| 5,375,143 | 12/1994 | Kazecki et al. | 375/14 |
| 5,432,794 | 7/1995 | Yaguchi | 371/5.5 |
| 5,648,986 | 7/1997 | Tatsumi et al. | 375/229 |

*Primary Examiner*—Don N. Vo
*Assistant Examiner*—Phuong Phu
*Attorney, Agent, or Firm*—Marshall, O'Toole, Gerstein, Murray & Borun

[57] ABSTRACT

A demodulation subsystem includes an equalizing demodulator and a non-equalization demodulator, each of which receive a baseband signal, and an output control selector that selects the output of one of the equalizing demodulator and the non-equalizing demodulator based on a bit error rate of the signal.

41 Claims, 4 Drawing Sheets

DUAL MODE RECEIVER

TECHNICAL FIELD

The present invention relates generally to receivers and, more particularly, to a receiver having a non-equalizing demodulator and an equalizing demodulator.

BACKGROUND ART

Communication systems employing digital transmitters and digital receivers are widely used. Such systems, which are commonly employed in mobile communication applications like cellular telephones, use digital modulation techniques such as binary phase shift keying (BPSK), quadrature phase shift keying (QPSK) or differential quadrature phase shift keying (DQPSK). Using these techniques, digital information is transmitted in bursts called frames, which are typically 20 milliseconds (ms) long. Frames generally have number of sections or subsections that may, for example, range in size from 160 to 640 microseconds ($\mu s$). Each frame section typically contains numerous digital symbols that are transmitted approximately every 40 $\mu s$. As is known, digital symbols may be encoded to each represent a number of digital bits. One frame section may be a preamble including a preamble bit sequence, which is known by each receiver that is to receive the transmitted frame, while other frame sections may include various bits representing digitized audio. In some applications, the preamble may be used to address the frame to a particular receiver or receivers. As will be appreciated by those familiar with the communication arts, not all of the information in each frame will be received error free because the fidelity of any particular communication system, while it may be high, is not perfect.

Bit error rate (BER) is a well-known metric that is used to specify or quantify the fidelity of a digital communication system. BER is a comparison between bits sent over a channel by a digital transmitter and bits received from the channel by a digital receiver. If the received bits are identical to the sent bits, the BER is zero, indicating that the communications system including the communication channel, the digital transmitter and the digital receiver has perfect fidelity. Conversely, if the bits received are substantially different from the bits that were sent, the communication system has low fidelity. For example, if there is one bit error in 100 bits, the BER is 0.01.

Digital communication systems are susceptible to various noise sources that decrease the fidelity of a communication system and, therefore, increase the BER of the communication system. Thermal noise (also called KT noise) is noise resulting from the temperature of various critical components in the digital communication system. Co-channel noise is noise caused by interference on the communication channel over which a digital transmitter is broadcasting. Of particular interest in mobile communication systems is multipath noise.

Multipath noise is noise caused by reception of delayed versions of a previously-received signal resulting from the fact that energy from a digital transmitter may take more than one path to a digital receiver. For example, energy from a digital transmitter that takes the most direct path to the receiver arrives at the receiver first, while energy taking another path, such as a path with one or more reflections from obstructions, the earth or the atmosphere, arrives at the digital receiver some relatively-short time later. Energy that does not take the most direct path from the digital transmitter to the digital receiver is called multipath energy, or simply "multipath." In a mobile communications system, such as a cellular system, where one or both of a digital receiver and a digital transmitter are moving, the communication path between a transmitter and receiver is constantly changing and, therefore, so is the multipath. For example, as a person using a cellular phone travels in his or her car, multipath may range from nonexistent at one geographic location, to extremely high at another geographic location. Because the multipath is always changing, it is difficult for a digital receiver in a mobile system to combat the effects of multipath.

It is known to use an equalizing demodulator in a receiver to reduce the effects of multipath. An equalizing demodulator is a device that attempts to adapt a digital receiver to the characteristics of a channel to thereby minimize the effects of multipath before converting a received signal into a bitstream. Equalizing demodulators (commonly called equalizers) are actually non-equalizing demodulators that also perform computationally intensive equalization routines to equalize a channel. As a result, equalizing demodulators are typically slower and consume significantly more power than non-equalizing demodulators. Accordingly, it is known to use a non-equalizing demodulator to convert a received signal into digital bitstream when the fidelity of the communication system is high, and to use an equalizing demodulator when the fidelity of the communication system is low.

U.S. Pat. No. 5,283,531 to Serizawa et al. (hereinafter "Serizawa et al.") discloses various techniques for selecting between an equalizing demodulator and a non-equalizing demodulator within a receiver. According to one technique, the Serizawa et al. system generates two bitstreams, wherein one bitstream is generated by a non-equalizing demodulator and the other is generated by an equalizing demodulator. The fidelity of the bitstreams from the non-equalizing demodulator and the equalizing demodulator are evaluated and the bitstream having the highest fidelity is selected for use in the receiver. Fidelity may be measured using bitstream coincidence with a reference bitstream or eye aperture measurements. A second technique disclosed in Serizawa et al. includes measuring fidelity using an eye aperture or a bit error rate of a bitstream generated by a non-equalizing demodulator and, based on a comparison to a threshold, selecting a bitstream from either a non-equalizing demodulator or an equalizing demodulator for use by the receiver. A third technique described in Serizawa et al. selects an output bitstream for use in the receiver based on the presence or absence of multipath. This technique uses a matched filter to generate a signal which is then compared to a threshold, wherein the period of time the generated signal is above the threshold generally indicates the presence or absence of multipath. If multipath is present, the system selects the equalizing demodulator bitstream while, if multipath is not present, the system selects the non-equalizing demodulator bitstream for use by the receiver.

A shortcoming of the techniques disclosed in Serizawa et al. is that they all require the continuous operation of a non-equalizing demodulator, even if the equalizing demodulator output is selected for use by the receiver. Operating a non-equalizing demodulator, even when the equalizing demodulator output is selected for use, requires additional power consumption because redundant processing is performed. Additionally, the Serizawa et al. system makes a bit error rate measurement after the RF signals are converted into a digital bitstream by the non-equalizing demodulator, which requires additional processing time (i.e., the time it takes the non-equalizing demodulator to convert the RF signal into a bitstream) when the equalizing demodulator output is being selected for use.

SUMMARY OF THE INVENTION

The present invention may be embodied in a receiver for use in demodulating a modulated signal, wherein the receiver includes a non-equalizing demodulator that demodulates the modulated signal to produce a first digital bitstream, an equalizing demodulator that equalizes and demodulates the modulated signal to produce a second digital bitstream, an output control selector that processes the modulated signal to determine a bit error rate associated with the modulated signal and a switch coupled to the non-equalizing demodulator and to the equalizing demodulator that delivers one of the first and second digital bitstreams as a receiver output based on the value of the bit error rate.

In some embodiments the modulated signal includes a plurality of frames each having an amble portion and wherein the output control selector includes a bit error rate (BER) long term averager that processes the amble portion of the frames to determine the bit error rate as a long term average BER and wherein the switch delivers the first digital bitstream as the receiver output when the long term average BER is below a first threshold. The amble portion may be a preamble or a midamble. The switch delivers the second digital bitstream as the receiver output when the long term average BER is above a second threshold.

In certain embodiments, a hysteresis region may exists between the first and second thresholds and wherein the switch continues to deliver the first digital bitstream as the receiver output when the long term average BER passes from below the first threshold into the hysteresis region and the switch continues to deliver the second digital bitstream as the receiver output when the long term average BER passes from above the second threshold into the hysteresis region. Additionally, a dual processing region may exists between the first and second thresholds and wherein the equalizing demodulator and the non-equalizing demodulator both operate when the long term average BER is in the dual processing region.

Each of the frames may include a multiplicity of subsections and further include a subsection processor that processes one of the subsections when the long term average BER is between the first and second thresholds. The subsection processor may determine a subsection quality metric of the one subsection and the switch compares the subsection quality metric to a third threshold wherein the switch delivers the first digital bitstream as the receiver output when the subsection quality metric of the one subsection is below the third threshold and the switch delivers the second digital bitstream as the receiver output when the subsection quality metric of the one subsection is above the third threshold.

The present invention may also be embodied in a demodulating system for use in a receiver that has a processor and that receives a modulated signal, wherein the demodulating system includes a memory and instructions stored by the memory and adapted for execution on the processor. When the processor executes the instructions, the instructions cause the processor to perform the steps of demodulating the modulated signal to produce a first digital bitstream, demodulating and equalizing the modulated signal to produce a second digital bitstream, processing the modulated signal to determine a bit error rate associated with the modulated signal and delivering one of the first and second digital bitstreams as the demodulation system output based on the value of the bit error rate.

In other embodiments, the demodulating system may include a logic device adapted to demodulate the modulated signal to produce a first digital bitstream, to demodulate and equalize the modulated signal to produce a second digital bitstream, to process the modulated signal to determine a bit error rate associated with the modulated signal and to deliver one of the first and second digital bitstreams as the demodulation system output based on the value of the bit error rate.

In another embodiment the present invention may be embodied in a demodulating system for use in a receiver having a processor and that receives a signal, the demodulating system includes a memory, a first software routine stored on the memory and adapted to be executed by the processor to demodulate the modulated signal to produce a first digital bitstream, a second software routine stored on the memory and adapted to be executed by the processor to demodulate and equalize the modulated signal to produce a second digital bitstream, a third software routine stored on the memory and adapted to be executed by the processor to process the modulated signal to determine a bit error rate associated with the modulated signal and a fourth software routine stored on the memory and adapted to be executed by the processor to deliver one of the first and second digital bitstreams as the demodulation system output based on the value of the bit error rate.

DESCRIPTION OF THE PREFERRED EMBODIMENT

Figure 1:
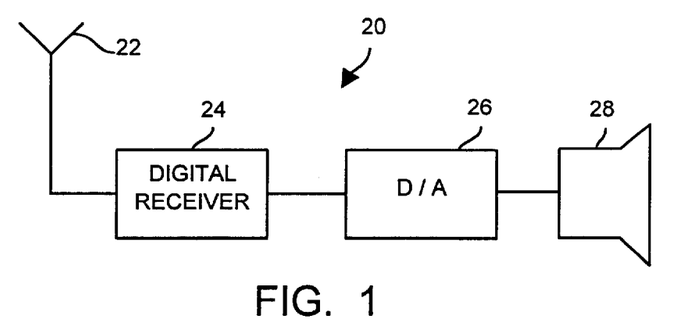
FIG. 1 is a block diagram of a digital receiver system.

Referring now to FIG. 1, a receiver system 20, which may be used in cellular telephones and the like, is shown. The receiver system 20 includes an antenna 22 that receives radio frequency (RF) signals and couples these signals to a digital receiver 24. The digital receiver 24 converts the RF signals into digital signals (e.g., a speech digital bitstream) and provides the digital signals to a digital to analog converter (D/A) 26. Using known techniques, the D/A 26 converts the digital signals into an analog speech signal that is coupled to, for example, a speaker 28, which may, for example, be found in an earpiece of a cellular telephone.

Figure 2:
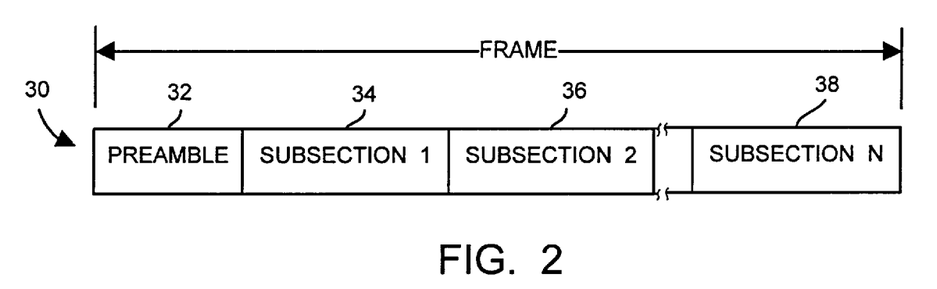
FIG. 2 is a graphical representation of an example communication frame.

FIG. 2 depicts a frame 30 that may be used in a digital communication system. In particular, the frame 30 is representative of the timing of the RF signals that are received by the antenna 22 and processed by the digital receiver 24 (FIG. 1). As illustrated in FIG. 2, the frame 30 includes a preamble 32 and any number of subsections 34, 36, 38. As will be appreciated by those skilled in the art, the preamble 32 and the various subsections 34, 36, 38 will be appropriately sized for the particular communication system in which the frame 30 is used. In some embodiments, the frame 30 is 20 ms long, each subsection is between 160 μs and 640 μs, and the preamble is 560 μs long. In such a system, a symbol is transmitted every 40 μs. Typically, the preamble includes information used in addressing the frame to a subscriber or subscribers, while each of the subsections includes voice or audio data. Alternatively, a communication frame may use a midamble or a postamble instead of the preamble shown in FIG. 2.

Figure 3:
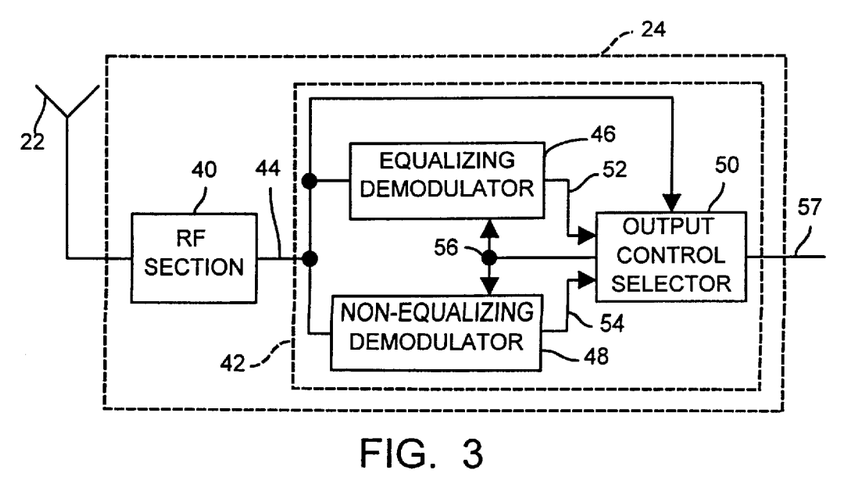
FIG. 3 is a block diagram of the digital receiver of FIG. 1.

Referring now to FIG. 3, the digital receiver 24 includes an RF section 40 that receives RF signals from the antenna 22. The RF section 40 is synchronized to select a particular RF signal from all of the RF signals received by the antenna 22 and downconverts the selected RF signal to create a baseband signal in any known or desired manner. As will be appreciated by those skilled in the art, the RF section 40 may include a mixer tuned to generate a baseband signal from a selected RF signal. The baseband signal is coupled from the RF section 40 to a demodulation system 42 on a line 44. The demodulation system 42, which converts the baseband signal into a digital bitstream for delivery to the D/A converter 26 (FIG. 1), includes an equalizing demodulator 46, a non-equalizing demodulator 48 and an output control selector 50 all coupled to receive the baseband signal developed by the RF section 40. The equalizing demodulator 46, which includes an adaptive equalizer capable of modifying its parameters to adapt to the characteristics of a communication channel to eliminate the effects of multipath, may be any type of known or desired equalizing demodulator that operates on analog baseband signals provided by the RF section 40. Likewise, the non-equalizing demodulator 48 may be any desired type of non-equalizing demodulator. Both of the demodulators 46, 48 are capable of processing the baseband signal from the line 44 to produce digital bitstreams on lines 52 and 54, respectively, which are coupled to the output control selector 50. As will be appreciated by those skilled in the art, the demodulators 46, 48 and the output control selector 50 may be implemented by suitable programming on a digital signal processor (DSP) or any other suitable signal processing hardware or hardware/software combination. As will be further appreciated by those having ordinary skill in the art, such signal processing hardware may use memories such as read only memory (ROM) or random access memory (RAM) to store programming or data used by the signal processing hardware. The signal processing hardware including the RAM or ROM may be embedded in an application specific integrated circuit (ASIC).

Of particular interest in FIG. 3 is the output control selector 50 which receives the baseband signal from the line 44, determines a bit error rate of the baseband signal and compares the bit error rate to one or more bit error rate thresholds. Based on the results of the comparison(s), the output control selector 50 generates control signals on a line 56 that are used to selectively enable and disable the equalizing demodulator 46 and the non-equalizing demodulator 48. Additionally, the output control selector 50, selects the appropriate bitstream from the lines 52 and 54 for output from the digital receiver 24 on a line 57. The functions of the output control selector 50 will be more thoroughly described in conjunction with FIGS. 4–8 below.

Figure 4:
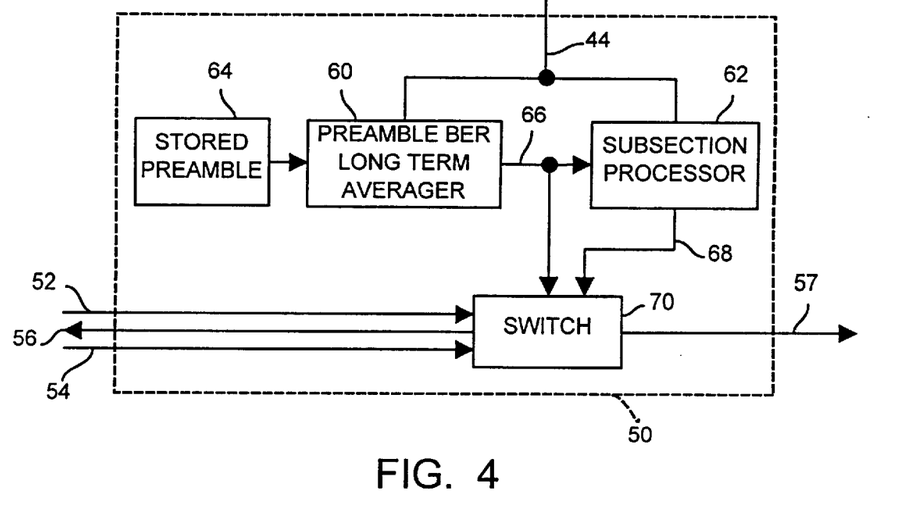
FIG. 4 is a block diagram of the output control selector of FIG. 3.

As illustrated in FIG. 4, the output control selector 50 includes a preamble BER long term averager 60 (hereinafter "BER averager"), a subsection processor 62 and a stored preamble 64. After the RF section 40 has processed the RF signals received by the antenna 22 into baseband signals, which are output on the line 44, the BER averager 60 is synchronized to processes only the preamble 32 of the frames 30 contained in the baseband signal. Processing may include comparing the preamble 32 of each frame 30 to the stored preamble 64 to estimate the BER of the preamble 32 of the incoming signal based solely on the BER of the received preamble bits. This comparison, which preferably determines a long term average BER, may include performing correlations that include, but are not limited to, Hamming and Euclidean distance correlations. The results of the comparison or correlations are generated approximately every 20 ms (e.g., the time spacing between consecutive preambles) and are averaged over a relatively long period of time, which may be, for example, 5 seconds. The output of the BER averager 60, which is the preamble BER, is coupled, via a line 66, to both the subsection processor 62 and a switch 70. Based on the value of the preamble BER and the type of thresholds and processing used by the receiver 24, digital information in the frame 30 will be processed by either the equalizing demodulator 46 or the non-equalizing demodulator 48 to generate a digital bitstream on either the line 52 or the line 54. The decision as to whether the equalizing demodulator 46 or the non-equalizing demodulator 48 is used to generate the digital bitstream is made by the switch 70 and control signals based on this decision are communicated to the equalizing demodulator 46 and the demodulator 48 via the line 56. The switch 70 also selects the bitstream on the line 52 or the line 54 for output on the line 57.

Figure 5:
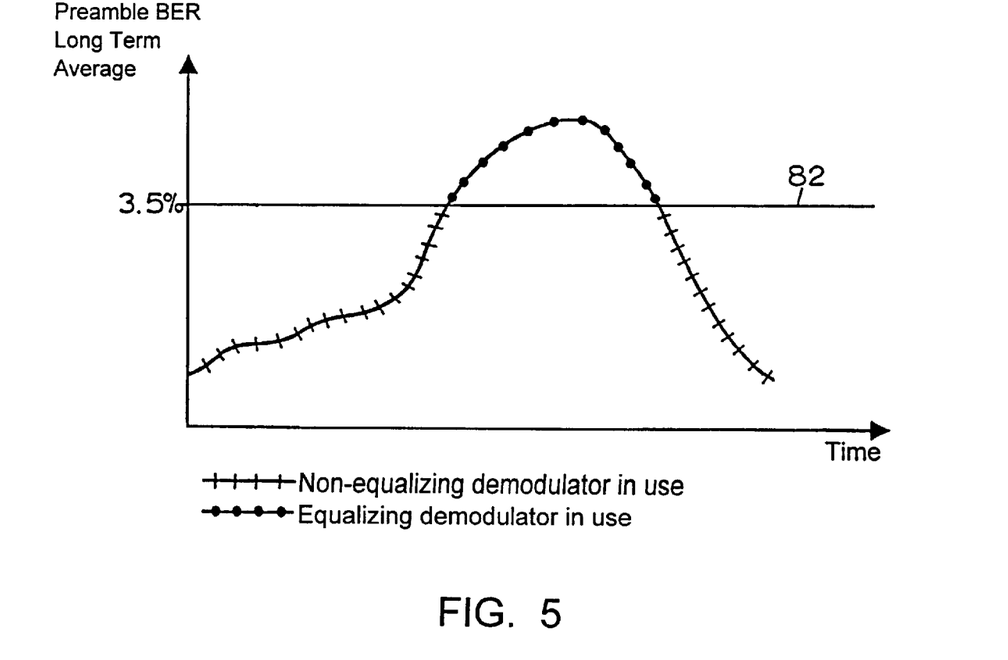
FIG. 5 is a graph of preamble BER long term average versus time, indicating the types of receiver processing used at particular times in a single threshold receiver system.
Figure 6:
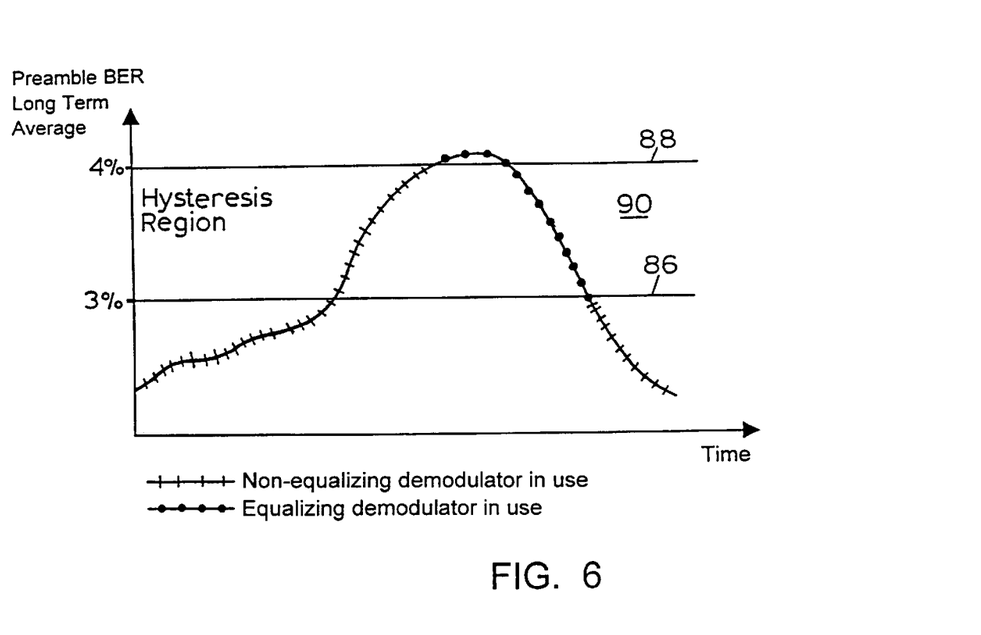
FIG. 6 is a graph of preamble BER long term average versus time, indicating the types of receiver processing used at particular times in a dual threshold receiver system having a hysteresis region.
Figure 8:
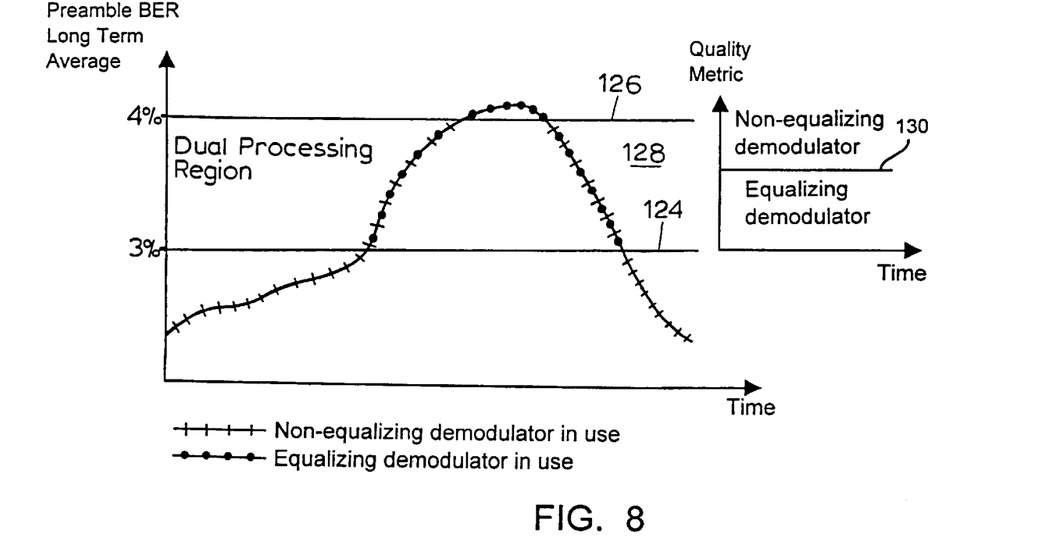
FIG. 8 is a graph of preamble BER long term average versus time, indicating the type of receiver processing used at particular times in a dual threshold receiver system having a dual processing region.

Generally, speaking the switch 70 receives the preamble BER measurement on the line 66 and compares that measurement to one or more BER thresholds. FIGS. 5, 6 and 8 illustrate different threshold and processing configurations that may be used by the switch 70 when it determines whether the equalizing demodulator 46 or the non-equalizing demodulator 48 should be used to convert the baseband signal into a bitstream. The fluctuation in preamble BER shown in FIGS. 5, 6 and 8 is due to the fact that a receiver is mobile and, therefore, the multipath component and thus the BER of the system fluctuates over time. Each graph shows an identical fluctuation of preamble BER over time so that the behavior of the receiver across different techniques using different thresholds can be seen more easily.

One threshold configuration that may be used by the switch 70, is a single threshold configuration show in FIG. 5. In the single threshold configuration, when the preamble BER, as determined by the BER averager 60, is below a threshold 82, the switch 70 enables only the non-equalizing demodulator 48 to convert the baseband signal into a bitstream and selects the bitstream on the line 54 for output on the line 57. However, when the preamble BER exceeds the threshold 82, the switch 70 only enables the non-equalizing demodulator 46 to convert the baseband signal into a bitstream and selects the bitstream of the line 52 for output on the line 57. For example, when the switch 70 receives indications from the BER averager 60 that the preamble BER is below the threshold 82, which is illustrated as corresponding to a preamble BER of 3.5 percent, the switch 70 activates, via the line 56, only the non-equalizing demodulator 48. When the preamble BER exceeds the threshold 82, the switch 70 deactivates the non-equalizing demodulator 48 and activates the equalizing demodulator 46. Although the threshold 82 is shown as being set at a preamble BER of 3.5 percent, one skilled in the art will readily recognize that the threshold 82 may be adjusted either up or down depending on the application of the receiver 24.

A second threshold configuration, which is illustrated in FIG. 6, uses a lower threshold 86, an upper threshold 88 and a hysteresis region 90 disposed therebetween. Generally, speaking, the equalizing demodulator 46 is used whenever the BER is above the upper threshold 88, the non-equalizing demodulator 48 is used whenever the BER is below the lower threshold 86 and the most recently selected demodulator (i.e., the equalizing demodulator 46 or the non-equalizing demodulator 48) is used in the hysteresis region 90 between the two thresholds 86, 88. Thus, in the second threshold configuration, the switch 70 only changes its selection from the equalizing demodulator 46 to the non-equalizing demodulator 48 when the switch 70 receives an indication from the BER averager 60 that the preamble BER is below the lower threshold 86. When the preamble BER is below the lower threshold 86, the switch 70 generates control signals on the line 56 that enable only the non-equalizing demodulator 48. As the preamble BER increases from below to above the lower threshold 86, the switch 70 continues to enable the non-equalizing demodulator 48. However, when the preamble BER increases from within the hysteresis region 90 to above the upper threshold 88, the switch 70 enables only the equalizing demodulator 46 and disables the non-equalizing demodulator 48. The switch 70 continues to enable only the equalizing demodulator 46 until the preamble BER goes below the lower threshold 86.

Figure 7:
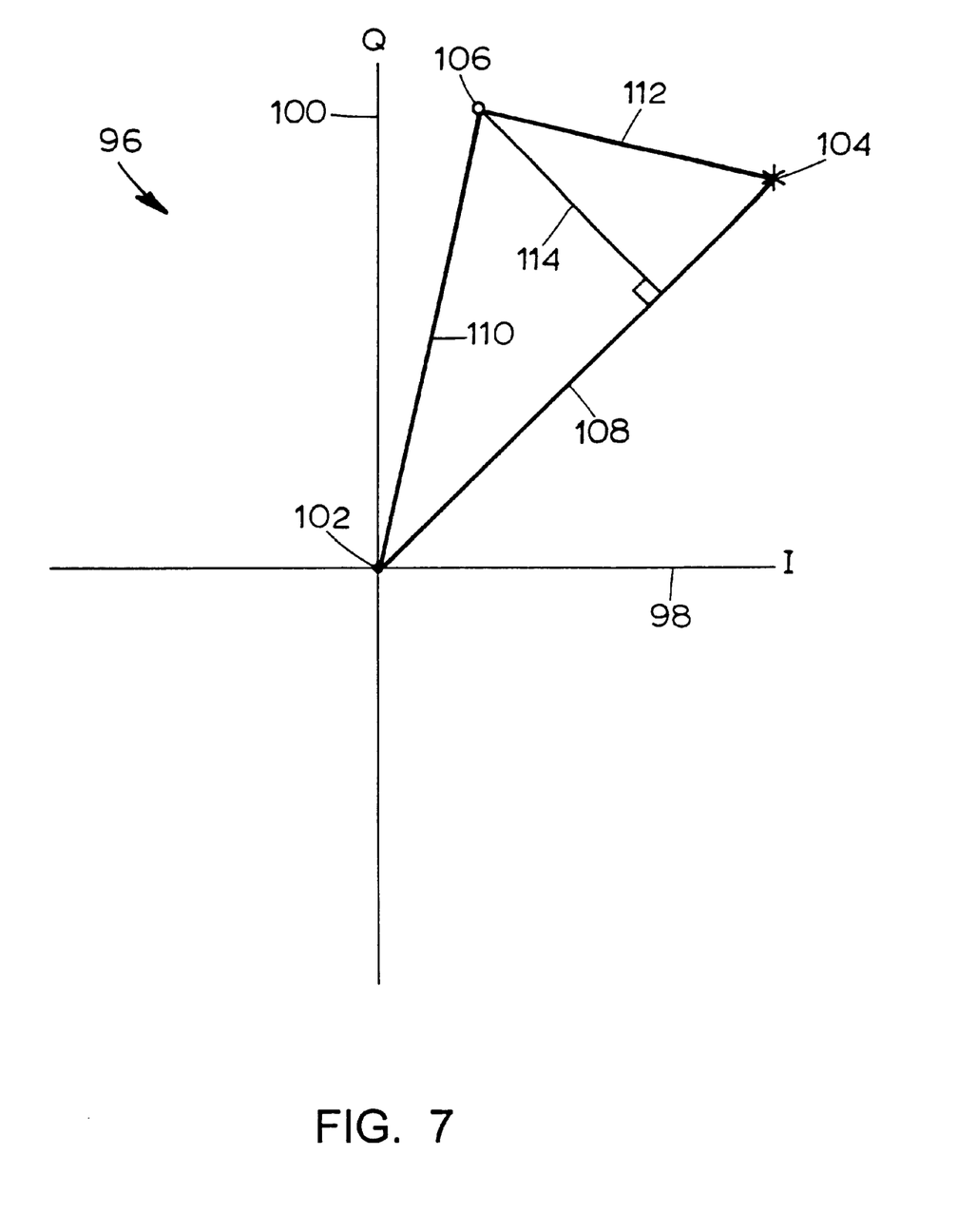
FIG. 7 illustrates a digital communication constellation diagram including a plots of an ideal received signal and a received signal having noise and interference.

In certain cases, it may be advantageous to rely not only on the preamble BER long term average, but to rely also on a quality metric taken directly from a subsection (e.g., 34, 36, 38) of the frame 30. Quality metrics may include, but are not limited to, a signal to noise ratio, a signal to noise and interference ratio and a signal to interference ratio. Such a measurement is made by the subsection processor 62, which processes subsections 34, 36, 38 of the frame 30 to make a subsection quality metric determination for the communication system. As will be appreciated by those of ordinary skill in the art and as shown in FIG. 7, a digital communication constellation 96 includes an in-phase axis 98 and a quadrature axis 100 that meet at an origin 102. In digital communication systems, baseband signals are broken into in-phase and quadrature components that may be plotted on a constellation to determine the digital symbol encoded in the baseband signal. In the absence of noise and interference baseband signals will always be decoded into precise predetermined locations on the digital communication constellation 96. One exemplary location is represented by reference numeral 104. However, in the presence of noise and interference, the baseband signal may be decoded into in-phase and quadrature components that do not fall on the precise predetermined locations. One exemplary received signal having noise and interference is plotted as reference numeral 106. A line 108 extending from the origin 102 to the location 104 represents a signal (S) and a line 110 extending from the original 102 to the location 106 represents a signal having noise and interference (S+N+I). Accordingly, the difference in location between location 106 and location 104, as represented by a line 112, is due to noise and interference (N+I). In accordance with one embodiment of the present invention, the subsection quality metric generated by the subsection processor 62 may be defined as the ratio of S to N+I. Alternatively, an estimated N+I called $(N+I)_E$ may be formed by perpendicularly connecting location 106 to the line 108 with a line 114, which represents $(N+I)_E$. Under such an arrangement, the subsection quality metric may be defined as the ratio of S to $(N+I)_E$. As will be appreciated by those of ordinary skill in the art, other subsection quality metrics such as a receive signal strength indicator (RSSI) may be used.

The subsection processor 62 is enabled based on the output of the BER averager 60, which is coupled to the subsection processor 62 via the line 66. When the preamble BER is between certain thresholds, the subsection processor 62 becomes active and calculates a subsection quality metric. Of course, when the subsection processor 62 is active, it makes a quality metric determination for every subsection of every frame.

FIG. 8 illustrates a threshold configuration having lower and upper thresholds 124, 126, respectively, and a dual processing region 128 disposed between the thresholds 124 and 126. When the preamble BER from the BER averager 60 is below the lower threshold 124, the subsection processor 62 is not enabled and the switch 70 enables only the non-equalizing demodulator 48. On the other hand, when the preamble BER exceeds the upper threshold 126, the subsection processor 62 is not enabled and the switch 70 enables the equalizing demodulator 46. However, when the preamble BER is in the dual processing region 128, the subsection processor 62 is enabled and either of the equalizing demodulator 46 and the non-equalizing demodulator 48 may be used. The subsection processor 62 accurately determines a quality metric for each subsection 34, 36, 38. The subsection quality metric generated by the subsection processor 62 is coupled to the switch 70. The switch 70 compares the subsection quality metric to a threshold 130 and, based on that comparison, (illustrated in the smaller graph on FIG. 8) enables either the equalizing demodulator 46 or the non-equalizing demodulator 48. Because a large, or high, subsection quality metric is desirable, a subsection quality metric above the threshold 130 indicates, for example, a high signal to noise ratio and, therefore, the switch 70 enables the non-equalizing demodulator 48. Conversely, subsection quality metric below the threshold 130 indicates, for example, a low signal to noise ratio and, therefore, the switch 70 enables the equalizing demodulator 46. In addition to enabling either the equalizing demodulator 46 or the non-equalizing demodulator 48, the switch 70 also selects the bitstream corresponding to the enabled element (e.g., the non-equalizing demodulator 48 or the equalizing demodulator 46) for output on the line 57.

The disclosed system provides for the selection of either a non-equalizing demodulator or an equalizing demodulator to convert a baseband signal into a digital bitstream based on either a preamble BER or a subsection quality metric determined directly from the baseband signal. Such a system reduces power consumption because only one of the non-equalizing demodulator or the equalizing demodulator needs to be enabled at any one time. Additionally, the disclosed system determines the preamble BER before the baseband signal is converted into a bitstream, which saves the processing time of converting the baseband signal into bits before making a BER determination. Furthermore, this system enables the operation of only one of the equalizing demodulator or the non-equalizing demodulator for demodulating any particular frame or subsection of a frame because the decision as to which demodulator to use is made before the baseband signal is converted to bits.

While the foregoing description addresses the processing of a frame having a preamble, frames having midambles or postambles may also be processed. Midamble or postamble processing requires only that the BER averager 60 recognize the position in the frame in which the midamble or postamble is located. The use of midamble or postambles creates the need for a delay in processing the contents of a particular frame. For example, when a preamble is used, the switch 70 enables either the non-equalizing demodulator 48 or the equalizing demodulator 46 to process the contents of the frame after the preamble BER determination has been made. However, when midambles or postambles are used, the switch 70 cannot enable the non-equalizing demodulator 48 or the equalizing demodulator 46 to process the frame contents because a portion of the frame came before the midamble or the postamble. Accordingly, a buffer or a queue may be added to buffer any frame contents that are received before the preamble or the midamble are received. Such a buffer would allow the switch 70 to enable either the non-equalizing demodulator 48 or the equalizing demodulator 46 to process all of the frame information after the BER averager 60 has processed the midamble or the postamble. Alternatively, a midamble or preamble from a previous frame may be used to determine the BER.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

What is claimed is:

1. A receiver for use in demodulating a modulated signal comprising:
   a non-equalizing demodulator that demodulates the modulated signal to produce a first digital bitstream;
   an equalizing demodulator that equalizes and demodulates the modulated signal to produce a second digital bitstream;
   an output control selector that processes the modulated signal to determine a bit error rate associated with the modulated signal; and
   a switch coupled to the non-equalizing demodulator and to the equalizing demodulator that delivers one of the first and second digital bitstreams as a receiver output based on a comparison of the bit error rate to a first threshold and a second threshold.

2. The receiver of claim 1, wherein the modulated signal includes a plurality of frames each having an amble portion and wherein the output control selector includes a bit error rate (BER) long term averager that processes the amble portion of the frames to determine the bit error rate as a long term average BER and wherein the switch delivers the first digital bitstream as the receiver output when the long term average BER is below the first threshold.

3. The receiver of claim 2, wherein the amble portion comprises a preamble.

4. The receiver of claim 2, wherein the amble portion comprises a midamble.

5. The receiver of claim 2, wherein the switch delivers the second digital bitstream as the receiver output when the long term average BER is above the second threshold.

6. The receiver of claim 5, wherein a hysteresis region exists between the first and second thresholds and wherein the switch continues to deliver the first digital bitstream as the receiver output when the long term average BER passes from below the first threshold into the hysteresis region and the switch continues to deliver the second digital bitstream as the receiver output when the long term average BER passes from above the second threshold into the hysteresis region.

7. The receiver of claim 5, wherein a dual processing region exists between the first and second thresholds and wherein the equalizing demodulator and the non-equalizing demodulator both operate when the long term average BER is in the dual processing region.

8. The receiver of claim 5, wherein each of the frames includes a multiplicity of subsections and further comprising a subsection processor that processes one of the subsections when the long term average BER is between the first and second thresholds.

9. The receiver of claim 8, wherein the subsection processor determines a subsection quality metric of the one subsection and the switch compares the subsection quality metric to a third threshold wherein the switch delivers the first digital bitstream as the receiver output when the subsection quality metric of the one subsection is above the third threshold and the switch delivers the second digital bitstream as the receiver output when the subsection quality metric of the one subsection is below the third threshold.

10. The receiver of claim 1, wherein the modulated signal includes a plurality of frames each having a preamble and wherein the output control selector includes a preamble bit error rate long term averager that processes the preamble of each of the frames to determine the bit error rate as a long term average preamble bit error rate and wherein the switch enables the non-equalizing demodulator and disables the equalizing demodulator when the long term average preamble bit error rate is below a first threshold.

11. The receiver of claim 1, wherein the modulated signal includes a plurality of frames each having a preamble and wherein the output control selector includes a preamble bit error rate long term averager that processes the preamble of one of the frames to determine the bit error rate as a long term average preamble bit error rate and wherein the switch delivers the second digital bitstream as the receiver output when the long term average preamble bit error rate is above a first threshold.

12. The receiver of claim 1, wherein the modulated signal includes a plurality of frames each having a preamble and wherein the output control selector includes a preamble bit error rate long term averager that processes the preamble of one of the frames to determine the bit error rate as a long term average preamble bit error rate and wherein the switch disables the non-equalizing demodulator and enables the equalizing demodulator when the long term average preamble bit error rate is above a first threshold.

13. A demodulating system for use in a receiver having a processor and that receives a modulated signal, the demodulating system comprising:
   a memory;
   instructions stored by the memory and adapted for execution on the processor, wherein execution of the instructions causes the processor to perform the steps of:
      demodulating the modulated signal to produce a first digital bitstream;
      demodulating and equalizing the modulated signal to produce a second digital bitstream;
      processing the modulated signal to determine a bit error rate associated with the modulated signal; and
      delivering one of the first and second digital bitstreams as the demodulation system output based on a comparison of the bit error rate to a first threshold and a second threshold.

14. The demodulating system of claim 13, wherein the memory comprises random access memory.

15. The demodulating system of claim 13, wherein the memory comprises read only memory.

16. The demodulating system of claim 15, wherein the read only memory is contained in an application specific integrated circuit.

17. The demodulating system of claim 13, wherein the modulated signal includes a plurality of frames each having a preamble portion and wherein the step of processing the modulated signal includes processing the preamble portion of the frames to determine the bit error rate as a long term average bit error rate (BER) and wherein the step of delivering one of the first and second digital bitstreams includes the steps of comparing the long term average BER to the first threshold and delivering the first digital bitstream as the demodulation system output when the long term average BER is below the first threshold.

18. The demodulating system of claim 17, wherein the step of delivering one of the first and second digital bitstreams includes the steps of comparing the long term average BER to the second threshold and delivering the second digital bitstream as the demodulation system output when the long term average BER is above the second threshold.

19. The demodulating system of claim 18, wherein a hysteresis region exists between the first and second thresholds and wherein the first digital bitstream is delivered when the long term average BER passes from below the first threshold into the hysteresis region and the second digital bitstream is delivered when the long term average BER passes from above the second threshold into the hysteresis region.

20. The demodulating system of claim 18, wherein a dual processing region exists between the first and second thresholds and wherein both of the steps of demodulating the modulated signal and demodulating and equalizing the modulated signal are both performed on the modulated signal when the long term BER average is in the dual processing region.

21. The demodulating system of claim 18, wherein the step of demodulating operates on a first portion of the modulated signal and not on a second portion of the modulated signal that is operated on by the step of demodulating and equalizing the modulated signal.

22. The demodulating system of claim 18, wherein the steps of demodulating and demodulating and equalizing operate on a first portion of the modulated signal.

23. The demodulating system of claim 18, wherein each of the frames includes a multiplicity of subsections and further comprising the step of determining a subsection quality metric of one of the subsections when the long term average quality metric is between the first and second thresholds.

24. The demodulating system of claim 23, further comprising the step of comparing the subsection quality metric of the one subsection to a third threshold, wherein the first digital bitstream is delivered as demodulating system output when the subsection quality metric of the one subsection is above the third threshold and the second digital bitstream is delivered when the subsection quality metric of the one subsection is below the third threshold.

25. A demodulating system for demodulating a modulated signal, the demodulating system comprising:
   a logic device adapted to perform the steps of:
     demodulating the modulated signal to produce a first digital bitstream;
     demodulating and equalizing the modulated signal to produce a second digital bitstream;
     processing the modulated signal to determine a bit error rate associated with the modulated signal; and
     delivering one of the first and second digital bitstreams as the demodulation system output based on a comparison of the bit error rate to a first threshold and a second threshold.

26. The demodulating system of claim 25, wherein the logic device comprises a processor.

27. The demodulating system of claim 25, wherein the processor comprises a digital signal processor.

28. The demodulating system of claim 27, wherein the logic device comprises an application specific integrated circuit.

29. The demodulating system of claim 25, wherein the modulated signal includes a plurality of frames each having a preamble portion and wherein the step of processing the modulated signal includes processing the preamble portion of the frames to determine the bit error rate as a long term average bit error rate (BER) and wherein the step of delivering one of the first and second digital bitstreams includes comparing the long term average BER to a first threshold and delivering the first digital bitstream as the demodulating system output when the long term average BER is below the first threshold.

30. The demodulating system of claim 29, wherein the step of delivering one of the first and second digital bitstreams includes the steps of comparing the long term average BER to a second threshold and delivering the second digital bitstream as the demodulating system output when the long term average BER is above the second threshold.

31. The demodulating system receiver of claim 30, wherein the first and second thresholds are selected so that a hysteresis region exists between the first and second thresholds and wherein the first digital bitstream is delivered when the long term average BER passes from below the first threshold into the hysteresis region and the second digital bitstream is delivered when the long term average BER passes from above the second threshold into the hysteresis region.

32. The demodulating system receiver of claim 30, wherein a dual processing region exists between the first and second thresholds and wherein both of the steps of demodulating the modulated signal and demodulating and equalizing the modulated signal are performed on the modulating signal when the long term average BER is in the dual processing region.

33. The demodulating system receiver of claim 30, wherein each of the frames includes a multiplicity of subsections and further comprising the step of determining a subsection quality metric of one of the subsections when the long term average quality metric is between the first and second thresholds.

34. The demodulating system of claim 33, further comprising the step of comparing the subsection quality metric of the one subsection to a third threshold, wherein the first digital bitstream is delivered as demodulating system output when the subsection quality metric of the one subsection is above the third threshold and the second digital bitstream is delivered as demodulating system output when the subsection quality metric of the one subsection is below the third threshold.

35. A demodulating system for use in a receiver that receives a signal, the demodulating system comprising:
   a processor;
   a memory communicatively coupled to the processor;
   a first software routine stored on the memory and adapted to be executed by the processor to demodulate the modulated signal to produce a first digital bitstream;

a second software routine stored on the memory and adapted to be executed by the processor to demodulate and equalize the modulated signal to produce a second digital bitstream;

a third software routine stored on the memory and adapted to be executed by the processor to process the modulated signal to determine a bit error rate associated with the modulated signal; and a fourth software routine stored on the memory and adapted to be executed by the processor to deliver one of the first and second digital bitstreams as the demodulation system output based on a comparison of the bit error rate to a first threshold and a second threshold.

36. The demodulating system of claim 35, wherein the modulated signal includes a plurality of frames each having a preamble portion and wherein the third software routine processes the preamble portion of the frames to determine the bit error rate as a long term average bit error rate (BER) and wherein fourth software routine compares the long term average BER to a first threshold and delivers the first digital bitstream as the demodulation system output when the long term average BER is below a first threshold.

37. The demodulating system of claim 36, wherein the step of delivering one of the first and second digital bitstreams includes the steps of comparing the long term average BER to a second threshold and delivering the second digital bitstream when the long term average BER is above the second threshold.

38. The demodulating system of claim 37, wherein a hysteresis region exists between the first and second thresholds and wherein the first digital bitstream is delivered when the long term average BER passes from below the first threshold into the hysteresis region and the second digital bitstream is delivered when the long term average BER passes from above the second threshold into the hysteresis region.

39. The demodulating system of claim 37, wherein a dual processing region exists between the first and second thresholds and wherein the steps of demodulating the modulated signal and demodulating and equalizing the modulated signal are both performed on the modulated signal when the long term average BER is in the dual processing region.

40. The demodulating system of claim 37, wherein each of the frames includes a multiplicity of subsections and further comprising a fifth software routine that determines a subsection quality metric of one of the subsections when the long term average BER is between the first and second thresholds.

41. The demodulating system of claim 40, wherein the fourth software routine compares the subsection quality metric of the one subsection to a third threshold, wherein the first digital bitstream is delivered as the demodulating system output when the subsection quality metric of the one subsection is above the third threshold and the second digital bitstream is delivered when the subsection quality metric of the one subsection is below the third threshold.

* * * * *